US011531137B2

(12) United States Patent
Abdallah et al.

(10) Patent No.: US 11,531,137 B2
(45) Date of Patent: Dec. 20, 2022

(54) SYSTEM AND METHOD FOR CHARACTERIZING RESERVOIR WETTABILITY FROM AN IMAGING TECHNIQUE COMBINED WITH MULTIPHYSICS LOGS AND DATA ANALYTICS

(71) Applicant: SCHLUMBERGER TECHNOLOGY CORPORATION, Sugar Land, TX (US)

(72) Inventors: Wael Abdallah, Dhahran (SA); Salah Mohammed Al-Ofi, Northern Khobar (SA); Tianhua Zhang, Clamart (FR); Junyi Yuan, Boston (MA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 21 days.

(21) Appl. No.: 16/787,084

(22) Filed: Feb. 11, 2020

(65) Prior Publication Data
US 2020/0257016 A1    Aug. 13, 2020

Related U.S. Application Data

(60) Provisional application No. 62/804,009, filed on Feb. 11, 2019.

(51) Int. Cl.
*G01V 11/00* (2006.01)
*E21B 49/00* (2006.01)
*G06T 3/40* (2006.01)

(52) U.S. Cl.
CPC .............. *G01V 11/00* (2013.01); *E21B 49/00* (2013.01); *G06T 3/4084* (2013.01)

(58) Field of Classification Search
CPC ........ G01V 11/00; E21B 49/00; G06T 3/4084
See application file for complete search history.

(56) References Cited

U.S. PATENT DOCUMENTS 9,291,050 B2    3/2016  Seleznev et al.
9,405,037 B2 *  8/2016  Al-Muthana ............ G01V 3/38
                        (Continued)

FOREIGN PATENT DOCUMENTS

EP       3176610 A1      6/2017
WO       2017127108 A1   7/2017

OTHER PUBLICATIONS

Anonymous, Methods and Computing Systems for Processing and Transforming Collected Data for Improved Visualization and Exploration and Production, Sep. 4, 2014, IP.com No. IPCOM000238590D, pp. 1-49 (Year: 2014).*

(Continued)

*Primary Examiner* — Mischita L Henson

(57) ABSTRACT

Embodiments of the present disclosure are directed towards systems and method for characterizing wettability. Embodiments may include acquiring, using at least one processor, multi-physics data and transforming the multi-physics data into transformed data that is more sensitive to wettability than the multi-physics data. Embodiments may further include processing, using a data processing engine, the acquired and transformed data using at least one of a data correlation technique and an inversion technique.

19 Claims, 7 Drawing Sheets

(56) References Cited

U.S. PATENT DOCUMENTS

| | | | |
|---|---|---|---|
| 2009/0030616 A1* | 1/2009 | Sugiura | G01V 11/00 |
| | | | 702/9 |
| 2009/0159260 A1* | 6/2009 | Ikeda | E21B 47/10 |
| | | | 166/252.5 |
| 2017/0160421 A1 | 6/2017 | Zhang et al. | |
| 2018/0120470 A1 | 5/2018 | Yamada et al. | |

OTHER PUBLICATIONS

Abdallah, W. et al., "Fundamentals of Wettability", Oilfield Review, 2007, (19), pp. 44-61.

Abdelaal, A. F. et al., "Integration of Dielectric Dispersion and 3D NMR Characterizes the Texture and Wettability of a Cretaceous Carbonate Reservoir", SPE 164150, presented at the SPE Middle East Oil and Gas Show and Conference, Manama, Bahrain, 2013, 12 pages.

Al-Ofi, S. M. et al., "Correlating Dielectric Dispersion Data and Wettability Index of a Carbonate Rock", SPE 192224 presented at the 2018 SPE Kingdom of Saudi Arabia Annual Technical Symposium and Exhibition, Dammam, Saudi Arabia, 20 pages.

Amott, E., "Observations Relating to the Wettability of Porous Media", Petroleum Transactions AIME, 1959, 216, pp. 156-162.

Archie, G. E., "The Electrical Resistivity Log as an Aid in Determining Some Reservoir Characteristics", Transactions of the AIME, 1942, 146(1), pp. 54-62.

Donaldson, E. C., et al., "Wettability determination and its effect on recovery efficiency", Society of Petroleum Engineers Journal, 1969, 9(1), pp. 13-20.

Gkortsas, V.-M. et al., "Indication of wettability from dielectric measurements on partially saturated rocks using effective medium models", Geophysics 2015, 80(5), pp. E257-E265.

Hizem, M. et al., "Dielectric Dispersion: A New Wireline Petrophysical Measurement", SPE 116130, presented at the 2008 SPE Annual Technical Conference and Exhibition, Denver, Colorado, USA, 21 pages.

Li, B. et al., "Interpreting Electro-facies and Fractures for an Oligocene Sandstone Reservoir Using Borehole Images Acquired in Synthetic Drilling Fluids—with Full Core Calibration: a Case Study from Songkhla Basin, Thailand", 2012, IPTC 15089, 11 pages.

Minh, C. C. et al., "Planning and Interpreting NMR Fluid-Characterization Log", SPE-84478, 2003, 12 pages.

Minh, C. C. et al., "Determination of Wettability From Magnetic Resonance Relaxation and Diffusion Measurements on Fresh-State Cores", presented at the 2015 SPWLA 56th Annual Logging Symposium, Long Beach, California, pp. 1-15.

Stroud, D. et al., "Analytical model for the dielectric response of brine-saturated rocks", Physical Review B, 1986, V34N8, pp. 5145-5153.

Valori, A. et al., "Downhole Wettability: The Potential of NMR", SPE-190332-MS, presented at the 2018 SPE EOR Conference at Oil and Gas West Asia, Muscat, Oman, pp. 1-8.

Valori, A. et al., "A Review of 60 Years of NMR Wettability", SCA2018-017, presented at the 2018 International Symposium of the Society of Core Analysts, Trondheim, Norway, 13 pages.

Venkataramanan, L. et al., "Experimental Study of the Effects of Wettability and Fluid Saturation on Nuclear Magnetic Resonance and Dielectric Measurements in Limestone", Petrophysics, 2014, 55(6), pp. 572-586.

Donaldson, E., and W. Alam. 2008. "Wettability" in Wettability, Chapter 1, pp. 1-54. Houston: Gulf Publishing Company.

* cited by examiner

SYSTEM AND METHOD FOR CHARACTERIZING RESERVOIR WETTABILITY FROM AN IMAGING TECHNIQUE COMBINED WITH MULTIPHYSICS LOGS AND DATA ANALYTICS

CROSS-REFERENCE TO RELATED APPLICATIONS

This application claims the benefit of U.S. Provisional Application having Ser. No. 64/804,009 filed on Feb. 11, 2019, the entire contents of which is incorporated herein by reference in its entirety.

FIELD

The subject disclosure relates to characterizing reservoir wettability.

BACKGROUND

Wettability is the tendency of one fluid to spread on, or adhere to, a solid surface in the presence of other immiscible fluids. In formation evaluation, prior knowledge of reservoir wettability may be important for accurate reservoir characterization and proper reservoir management, specifically for planning oil recovery techniques.

There are several industrial-accepted methods to determine wettability based on core samples measurement in a laboratory. These methods include Amott (Amott, E. 1959. "Observations relating to the wettability of porous rock." Transactions of the AIME 156-162), United States Bureau of Mines (USBM) (Donaldson, E. C., R. D. Thomas, and P. B. Lorenz. 1969. "Wettability determination and its effect on recovery efficiency." SPE Journal (9): 13-20. doi:10.2118/2338-PA), or a combination of those methods (Donaldson, E., and W. Alam. 2008. Wettability. Houston: Gulf Publishing Company). A further review of such techniques is available in Abdallah et al., et al., 2007. "Fundamentals of wettability." Oilfield Review (Schlumberger) (19): 44-61.

Laboratory measurements of wettability indices are time consuming and may take several weeks to complete. In addition, these methods suffer from possible fluid loss and wettability alteration of the core sample because of sample handling and transfer to a laboratory and therefore, its original state is altered and does not represent the reservoir formation conditions. Additionally, due to laboratory device limitation, such information can only be derived on a rock sample with sufficient volume e.g. 1 inch or more in diameter and 1 inch or more in length. Finding measurements sensitive to wettability and with better rock volume differentiation, to infer the downhole wettability state is therefore desirable.

SUMMARY

In one or more embodiments of the present disclosure a computer-implemented method for characterizing wettability is provided. The method may include acquiring, using at least one processor, multi-physics data and transforming the multi-physics data into transformed data that is more sensitive to wettability than the multi-physics data. The method may further include processing, using a data processing engine, the acquired and transformed data using at least one of a data correlation technique and an inversion technique.

One or more of the following features may be included. In some embodiments, the multi-physics data may be acquired from downhole logging images. The multi-physics data may be acquired from laboratory data. The multi-physics data may be acquired from downhole logging images and laboratory data. The multi-physics data may include at least one of electrical, nuclear scattering, nuclear resonance, density and/or acoustical data. The multi-physics data may be representative of rock and material properties both azimuthally and vertically with a high pixel resolution. The multi-physics data may be transformed into transformed data using a prior knowledge of wettability.

In yet another embodiment of the present disclosure a non-transitory computer-readable storage medium having stored thereon instructions, which when executed by a processor result in one or more operations is provided. Operations may include acquiring, using at least one processor, multi-physics data and transforming the multi-physics data into transformed data that is more sensitive to wettability than the multi-physics data. Operations may further include processing, using a data processing engine, the acquired and transformed data using at least one of a data correlation technique and an inversion technique.

One or more of the following features may be included. In some embodiments, the multi-physics data may be acquired from downhole logging images. The multi-physics data may be acquired from laboratory data. The multi-physics data may be acquired from downhole logging images and laboratory data. The multi-physics data may include at least one of electrical, nuclear scattering, nuclear resonance, density and/or acoustical data. The multi-physics data may be representative of rock and material properties both azimuthally and vertically with a high pixel resolution. The multi-physics data may be transformed into transformed data using a prior knowledge of wettability.

In one or more embodiments of the present disclosure a system for characterizing wettability is provided. The system may include at least one processor configured to acquire multi-physics data and transform, using the at least one processor, the multi-physics data into transformed data that is more sensitive to wettability than the multi-physics data. The system may further include a data processing engine configured to process the acquired and transformed data using at least one of a data correlation technique and an inversion technique.

One or more of the following features may be included. In some embodiments, the multi-physics data may be acquired from downhole logging images. The multi-physics data may be acquired from laboratory data. The multi-physics data may be acquired from downhole logging images and laboratory data. The multi-physics data may include at least one of electrical, nuclear scattering, nuclear resonance, density and/or acoustical data. The multi-physics data may be representative of rock and material properties both azimuthally and vertically with a high pixel resolution. The multi-physics data may be transformed into transformed data using a prior knowledge of wettability.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

Figure 1:
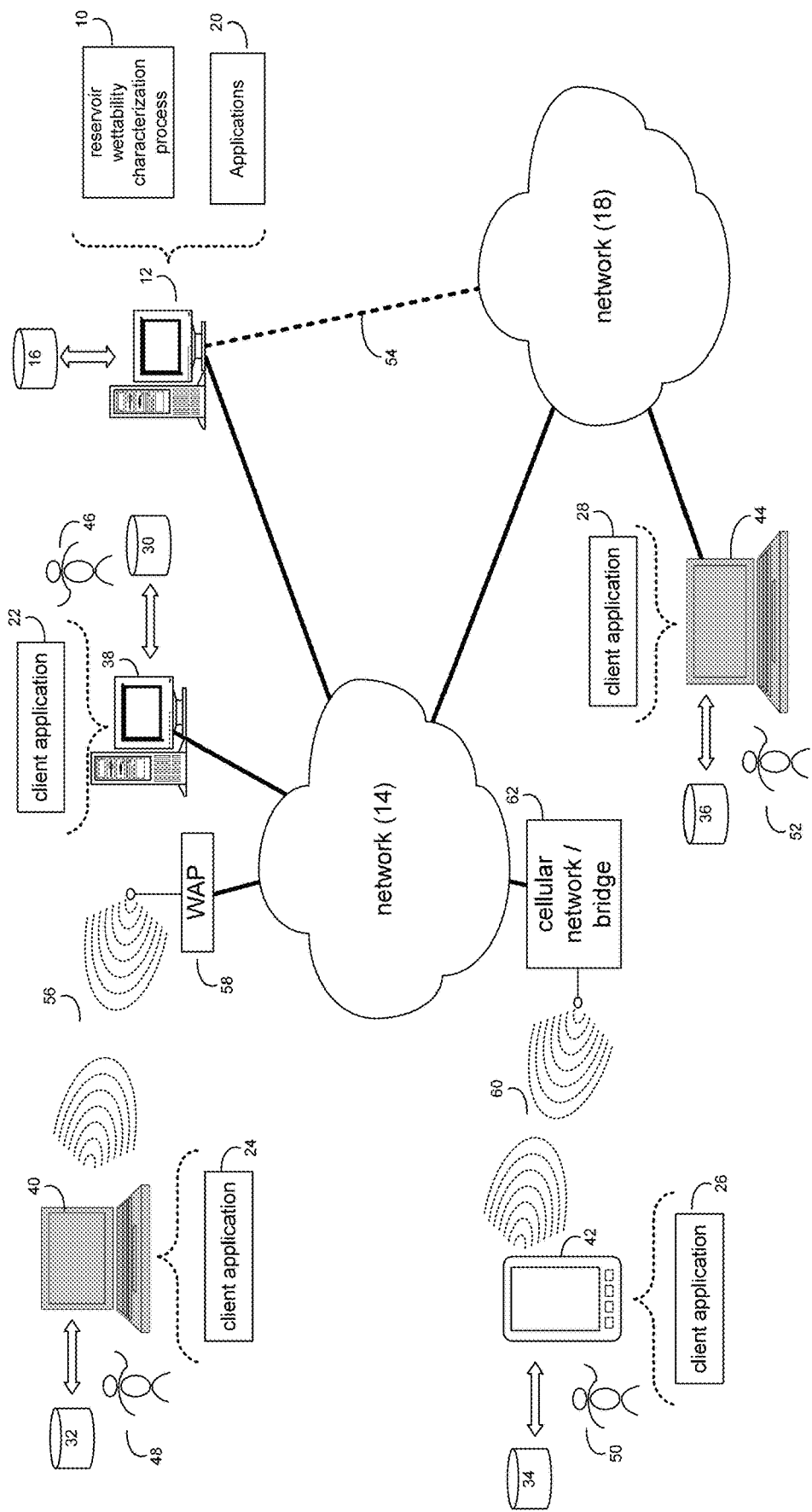
FIG. 1 illustrates a block diagram of a system for reservoir wettability characterization process in accordance with embodiments of the present disclosure.

Embodiments of the present disclosure are directed towards a system and method for characterizing wettability. Embodiments may include acquiring multi-physics data representing rock and material properties both azimuthally and vertically with high pixel resolution. In some embodiments, the pixel resolution can be equal to 1.0 inch by 1.0 inch on a 2D scale or can be as high as 0.1 inch by 0.1 inch on a 2D scale or higher resolutions are also contemplated. In some embodiments, the multi-physics data may include, but is not limited to electrical, nuclear scattering, nuclear resonance, density, acoustics, etc. Embodiments may include transforming some or all of the acquired multi-physics data into transformed data that is more sensitive to wettability. A data processing engine may be employed to process both the acquired and transformed data using data correlation and/or inversion techniques. Multi-physic may be defined as coupled processes involving more than one simultaneously occurring physical fields. The physical fields may include electromagnetics, acoustics, nuclear, gravity etc.

The discussion below is directed to certain implementations and/or embodiments. It is to be understood that the discussion below may be used for the purpose of enabling a person with ordinary skill in the art to make and use any subject matter defined now or later by the patent "claims" found in any issued patent herein.

It is specifically intended that the claimed combinations of features not be limited to the implementations and illustrations contained herein but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms may be used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered a same object or step.

Referring to FIG. 1, there is shown a reservoir wettability characterization process 10 that may reside on and or be associated with any other computing device. Aspects of process 10 may be (wholly or partly) executed by server computer 12, which may be connected to network 14 (e.g., the Internet or a local area network). Examples of server computer 12 may include, but are not limited to: a personal computer, a server computer, a series of server computers, a mini-computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, reservoir wettability characterization process 10 may reside on and be executed, in whole or in part, by a client electronic device, such as a personal computer, notebook computer, personal digital assistant, or the like.

The instruction sets and subroutines of reservoir wettability characterization process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid-state drive, a tape drive; an optical drive; a RAID array; a random-access memory (RAM); and a read-only memory (ROM). Storage device 16 may include various types of files and file types.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Reservoir wettability characterization process 10 may be a standalone application or may be an applet/application/ script that may interact with and/or be executed within application 20. In addition/as an alternative to being a server-side process, reservoir wettability characterization process 10 may be a client-side process (not shown) that may reside on a client electronic device (described below) and may interact with a client application (e.g., one or more of client applications 22, 24, 26, 28). Further, reservoir wettability characterization process 10 may be a hybrid server-side/client-side process that may interact with application 20 and a client application (e.g., one or more of client applications 22, 24, 26, 28). As such, reservoir wettability characterization process 10 may reside, in whole, or in part, on server computer 12 and/or one or more client electronic devices.

The instruction sets and subroutines of application 20, which may be stored on storage device 16 coupled to server computer 12 may be executed by one or more processors (not shown) and one or more memory modules (not shown) incorporated into server computer 12.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access reservoir wettability characterization process 10.

Users 46, 48, 50, 52 may access reservoir wettability characterization process 10 and/or other applications associated with server computer 12 directly through the device on which the client application (e.g., client applications 22, 24, 26, 28) is executed, namely client electronic devices 38, 40, 42, 44, for example. Users 46, 48, 50, 52 may access process 10 and/or other applications directly through network 14 or through secondary network 18. Further, server computer 12 (i.e., the computer that executes these applications) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

In some embodiments, reservoir wettability characterization process 10 may generate an output that may be delivered to one or more onsite tools such as reservoir tool 74, which may be configured to perform one or more reservoir operations. Reservoir tool 74 may include, but is not limited to, those available from the Assignee of the present disclosure. In some embodiments, reservoir tool 74 may include one or more processors configured to receive and/or produce an output from reservoir wettability characterization process 10 and alter the operations of reservoir tool 74.

Figure 2:
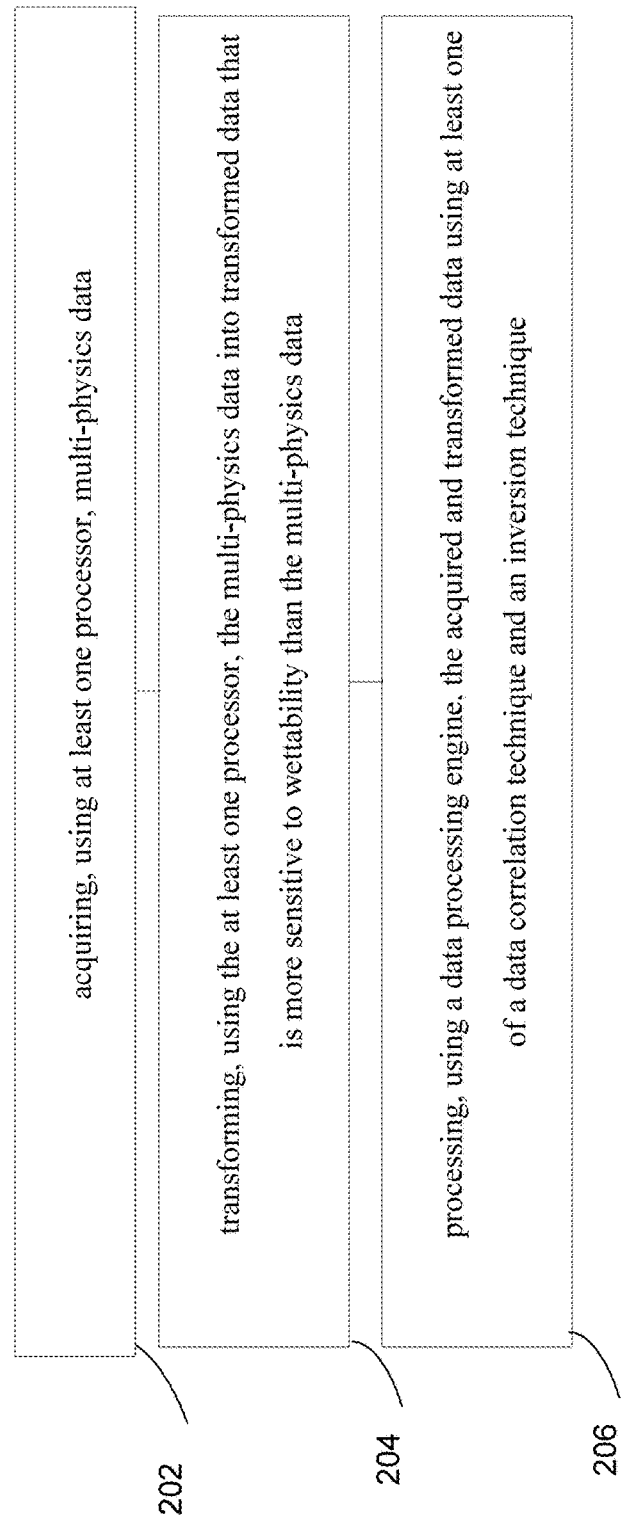
FIG. 2 illustrates a flowchart showing operations of reservoir wettability characterization consistent with embodiments of the present disclosure.

Referring now to FIG. 2, a flowchart 200 consistent with embodiments of reservoir wettability characterization process 10 is provided. Embodiments may include acquiring (202), using at least one processor, multi-physics data and transforming (204) the multi-physics data into transformed data that is more sensitive to wettability than the multi-physics data. Embodiments may further include processing (206), using a data processing engine, the acquired and transformed data using at least one of a data correlation technique and an inversion technique. Numerous other operations are also within the scope of the present disclosure as is discussed in further detail hereinbelow.

Figure 3:
FIG. 3 illustrates another flowchart showing operations of reservoir wettability characterization consistent with embodiments of the present disclosure.

In some embodiments, and referring also to FIG. 3, the wettability characterization system described herein may include acquisition image-based multi-physics data as well as applying one or more wettability guided non-linear data transforms. The multi-physics data may be obtained from downhole logging and/or laboratory measurements. The multi-physics data may include, but is not limited to, electrical, nuclear scattering, nuclear resonance, density, acoustics, etc. In some cases, some or all of the multi-physics data may require measurements with two-dimensional ("2D") coverage, e.g., both azimuthal and vertical directional coverage. In this case, rock/material heterogeneity may be captured in the data in both azimuthal and vertical directions.

In some embodiments, the acquired multi-physics data may be vectorized into the following two-dimensional vectors:

$$A = \begin{bmatrix} dielectric_1 & image_1 & ...neutron_1 \\ dielectric_2 & image_2 & ...neutron_2 \\ & ... & \\ dielectric_m & image_m & ...neutron_m \end{bmatrix} = A(m) \quad (1)$$

in which the column number is the dimension of features and the line number "m" is the number of measurement physics (e.g., dielectric, image, neutron, etc.). "A" is represented as A(m) for simplicity.

In some embodiments, and as discussed above, reservoir wettability characterization process 10 may apply one or more wettability guided non-linear data transforms. In operation, prior knowledge of wettability may be used to transform previously acquired data into one or more new datasets. The prior wettability knowledge may include, but is not limited to, the dielectric response of a porous media to wettability and to fluid saturation. Thus, the transformed data plus original measurement data may have a better differentiated wettability effect from water saturation effect.

In some embodiments, multi-frequency dielectric interpretation parameters, e.g., water-phase tortuosity, from effective medium theory models (Stroud et al., 1986, "Analytical model for the dielectric response of brine-saturated rocks", Physical Review B, V34N8, page 5145-5153, 15 Oct. 1986) may have sensitivity to the wetting condition of a formation (Gkortsas et al., 2015. "Indication of wettability from dielectric measurements on partially saturated rocks using effective medium models." Geophysics (80): 257-265. doi:10.1190/GEO2015-0028.1). Therefore, variations caused by wettability may be quantified on downhole logging data utilizing both the original logging dataset and the newly transformed dataset. This may improve wettability characterization compared to utilizing only the original datasets.

In some embodiments, and by way of example, the following integral equations may be used to achieve a general non-linear transform of data. From the two-dimensional vector A in equation (1) provided above a new dataset may be derived with a non-linear kernel K(x,m) and an integral type of transform may be performed:

$$g(y) = \int_\Omega k(x,m) A(m) dm, x \in R^2, \Omega \in R^2 \quad (2)$$

In some embodiments, the kernel K(x,m) may be selected in such a way that the new dataset g(y) may be more sensitive to wettability. With proper handling, the new dataset g(y) may keep the sensitivity both azimuthally and vertically, e.g., in the same data format as original input imaging data.

In some embodiments, there may be multiple ways to define the kernel K(x,m). One example is a method described in co-owned U.S. Publication No.: 2018-0120470, the contents of which is incorporated herein by reference in its entirety. This is a method used for calibrating and applying a petrophysical model to derive the new set of data. A further example is the method described in U.S. Pat. No. 10,502,858, the contents of which is also incorporated herein by reference in its entirety.

Figure 4:
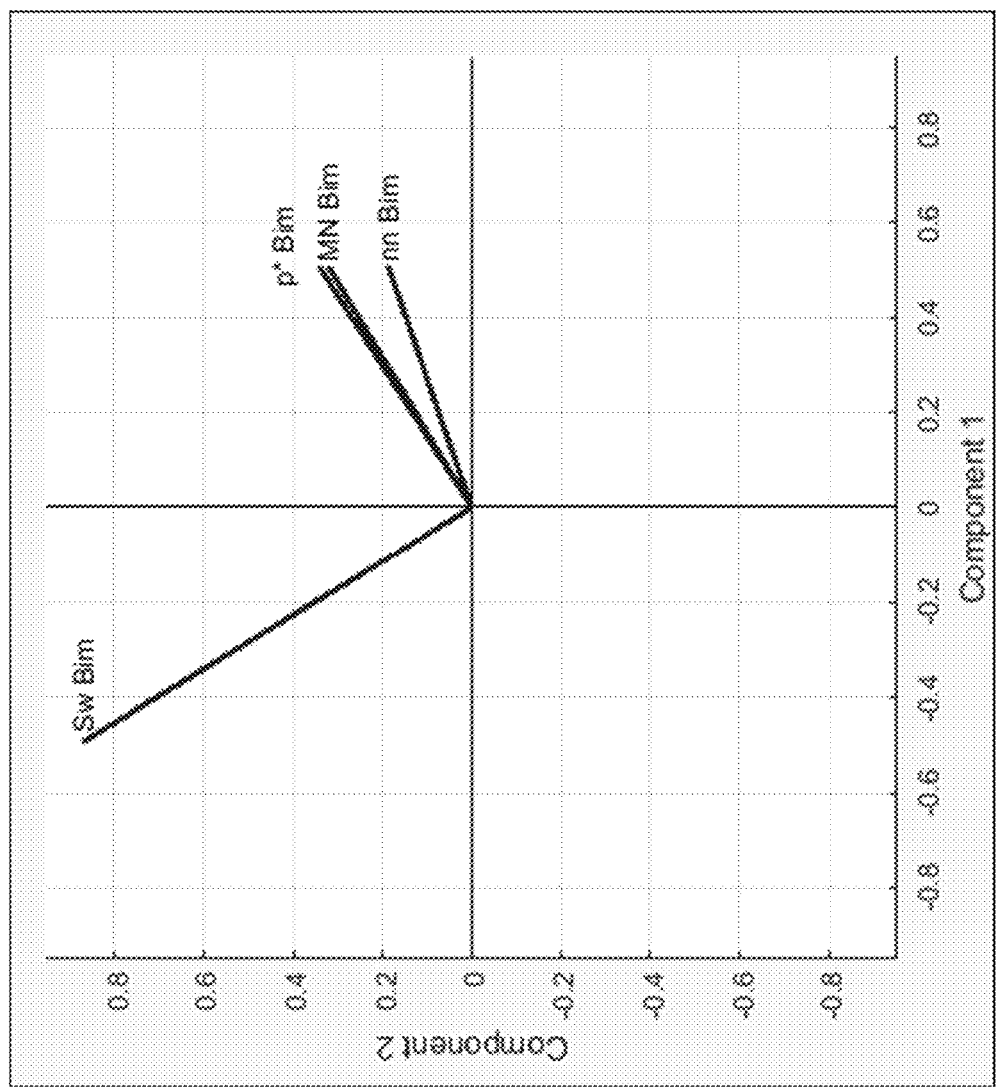
FIG. 4 illustrates an example shown in laboratory measurements where the transformed dataset MN Bim correlates more with Archie saturation exponent nn Bim (which is often used as a wettability indicator) and correlates less with lab measured saturation Sw Bi, which is consistent with embodiments of the present disclosure.

Referring now to FIG. 4, an embodiment of reservoir wettability characterization process 10 showing an example of laboratory data analysis results on five rock plugs is provided. In this example, the laboratory measured water saturation (Sw Bim) does not correlate with the newly transformed dataset MN Bim. As shown in the figure, they have very different weighting coefficients in Component 1 and Component 2 coordinate axis. At the same time, newly transformed dataset MN Bim correlates very well with conventional Archie equation's saturation exponent n, which is commonly used as a wettability index in the oil industry and is provided herein merely by way of example.

$$Sw^n = \frac{a \cdot R_w}{\phi^m \cdot R_t}$$

Figure 5:
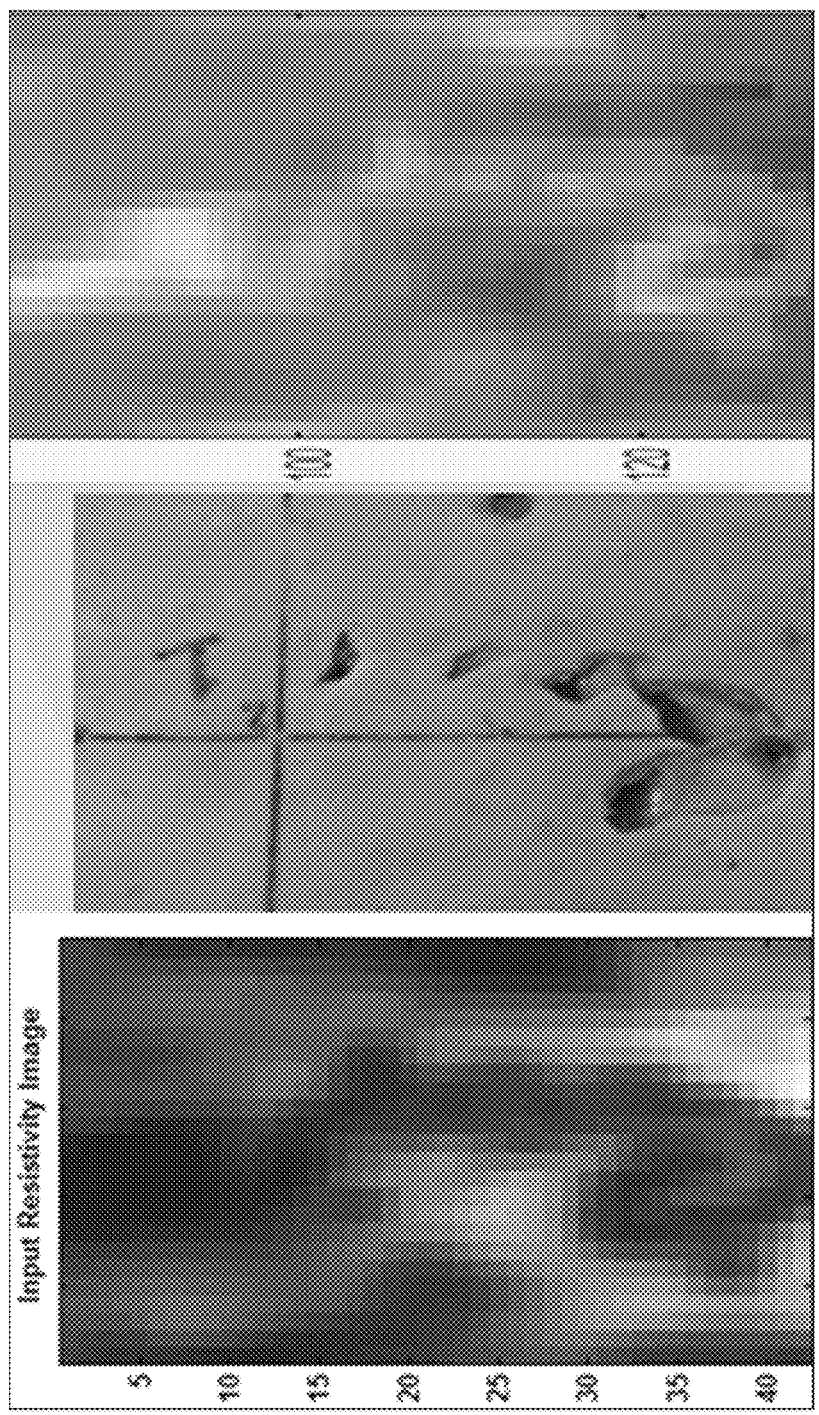
FIG. 5 illustrates an example of an original input image (left image), rock photograph (middle image) and transformed MN image (right image) consistent with embodiments of the present disclosure.

In the above equation, "n" is the saturation exponent. FIG. 5 shows an example of such a transformed dataset in the format of an image.

In some embodiments, reservoir wettability characterization process 10 may include a feature-based processing engine. After the generation of the new dataset, a new 2D vectorized matrix may be built combining both the original multi-physics data and the transformed new data as provided in Equation 4 below:

$$Anew = \begin{bmatrix} dielectric_1 & image_1 & ...neutron_1 & MN_1 \\ dielectric_2 & image_2 & ...neutron_2 & MN_2 \\ & ... & & \\ dielectric_m & image_m & ...neutron_m & MN_m \end{bmatrix} = Anew(m) \quad (4)$$

As such, in some embodiments, a new processing engine may be used to separate saturation effect from wettability effect and derive a wettability index. In some embodiments, the processing engine may be data feature-based rather than analytical/empirical based. The processing engine may analyze correlations among the data and extract one or more features (e.g., wettability, saturation, porosity, etc.) having high variations and low variations. With the prior knowledge of the response with respect to wettability and saturation and other features, a mathematical method may be designed to separate these features and derive a wettability index.

In some embodiments, the general mathematical method may be in the form of weighting coefficients w(k) which may be used to convolve with the new input datasets Anew(m) in a non-linear function f(x) into wettability index t(k) as shown in Equation 5 provided below:

$$t(k) = f(Anew \cdot w(k)) \quad (5)$$

In some embodiments, one implementation of f(x) and w(k) may involve normalizing the original and new dataset with another dataset. This dataset may be one or multiple combinations of the original and new dataset. In mathematical form this may be equivalent to:

$$f(x) = x, w(k) = 1/\text{maximum}(Anew) \quad (6)$$

In some embodiments, neural networks may be utilized by reservoir wettability characterization process 10. Neural networks may utilize mathematical methods used with complex data relationships provided the dataset is sufficient. In its basic form, a neuron is the basic computational unit. Mathematically, a neuron may perform three operations: (a) A dot production of the input and the weights; (b) adds a bias to the dot production and (c) applies the activation function to the sum as shown in Equation 7 provided below:

$$a = f(\Sigma_i w_i x_i + b) \quad (7)$$

Figure 6:
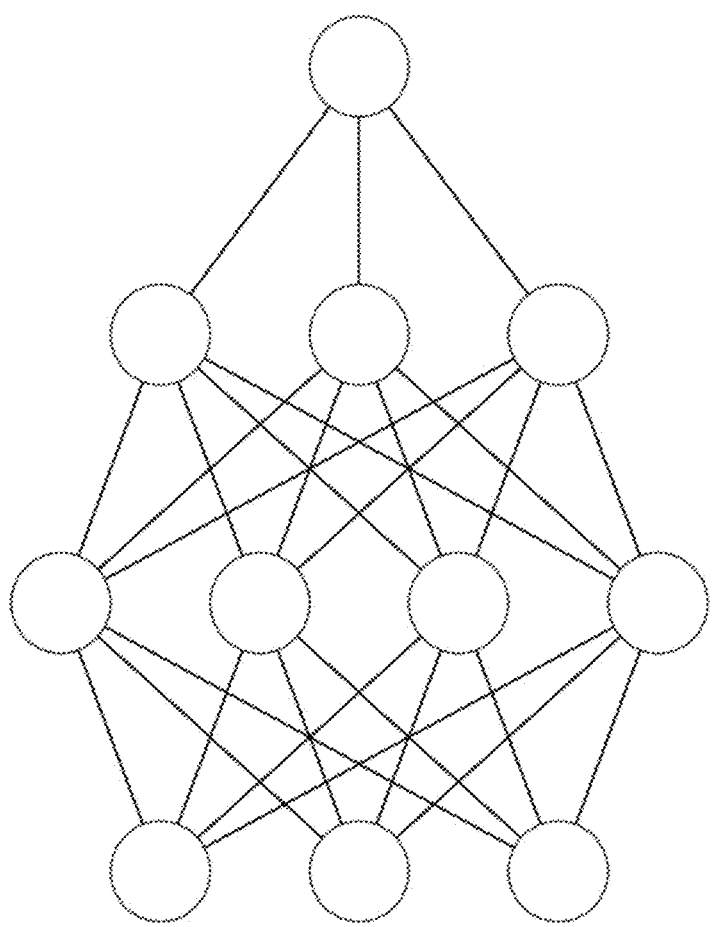
FIG. 6 depicts and illustrates a 3-layer neural network with 3 inputs and 1 output consistent with embodiments of the present disclosure.

In some embodiments, a neural network may include an acyclic graph of neurons which may be organized into distinct layers as is shown in FIG. 6. The last layer of the network is taken as the output.

Figure 7:
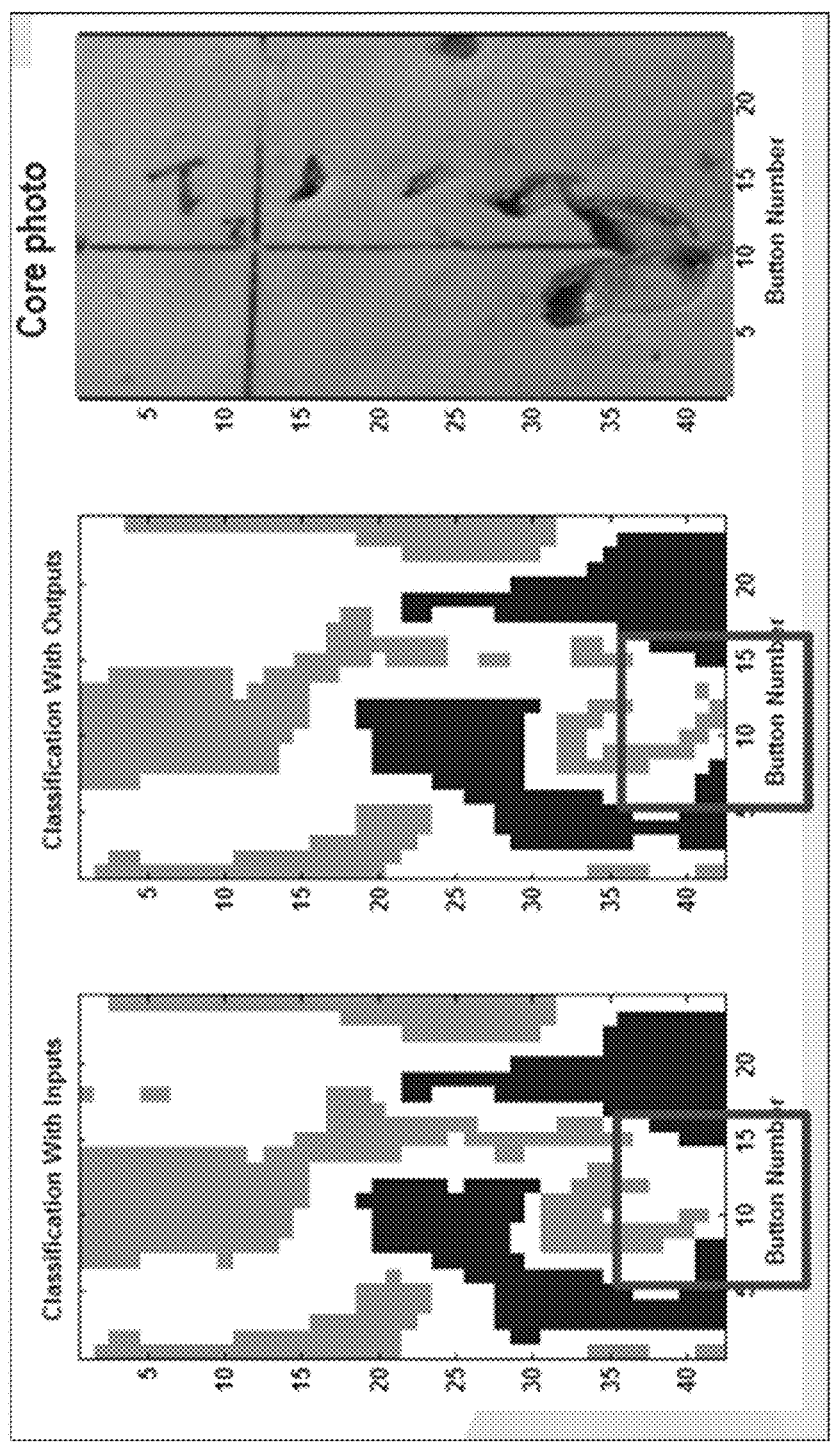
FIG. 7 illustrates an open vug wettability classification improvement (highlighted square) using MN dataset (middle image) compared to using only multi-physics inputs (left image) consistent with embodiments of the present disclosure.

Referring now to FIG. 7, an embodiment showing an improved water wetting classification surrounding an open vug by using the input dataset with the transformed MN dataset. When using the original input, A(m), the bottom of the vug is not characterized as water-wet (left image). When supplementing with the transformed MN, using a new A(m), the vug wettability may be characterized as being more complete.

In some embodiments, and as discussed herein, reservoir wettability characterization process 10 may invert downhole wettability from downhole logging images, laboratory data or both. Further, embodiments included herein may be used to correct downhole wettability using multi-physics logs. In non-limiting examples, these logs may include, but are not limited to, dielectric, resistivity, pulse-neutron, and/or nuclear magnetic resonance ("NMR"), etc.

Embodiments included herein may provide for high resolution heterogeneity in both azimuthal and vertical directions and may also perform a non-linear data transform using prior wettability knowledge. In some embodiments, reservoir wettability characterization process 10 may be configured to correct downhole wettability using a data relationship algorithm and may also combine data analytics and downhole logs to derive formation wettability. In some embodiments, reservoir wettability characterization process 10 may also be configured to identify downhole surface wettability at different image scales.

It is specifically intended that the claimed combinations of features not be limited to the implementations and illustrations contained herein but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms may be used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered a same object or step.

The flowchart and block diagrams in the figures illustrate the architecture, functionality, and operation of possible implementations of systems and methods and according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, $C^{++}$, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Having thus described the disclosure of the present application in detail and by reference to embodiments thereof, it will be apparent that modifications and variations are possible without departing from the scope of the disclosure defined in the appended claims.

The invention claimed is:

1. A method, comprising:
acquiring, using at least one processor, multi-physics data;
transforming, using the at least one processor, the multi-physics data into transformed data, wherein transforming the multi-physics data comprises performing a non-linear data transform using a prior knowledge of wettability;
processing, using a data processing engine, the acquired and transformed data using at least one of a data correlation technique and an inversion technique to generate output data, wherein the output data provides an improved wettability characterization as compared to processing the acquired data alone;
delivering the output data to a reservoir tool; and
altering an operation of the reservoir tool in response to the output data received by the reservoir tool.

2. The method of claim 1, wherein the multi-physics data is acquired from downhole logging images, laboratory data, or from downhole logging images and laboratory data.

3. The method of claim 1, wherein the multi-physics data includes at least one of electrical, nuclear scattering, nuclear resonance, density and/or acoustical data.

4. The method of claim 1, wherein the multi-physics data is representative of rock and material properties both azimuthally and vertically with a pixel resolution of at least 1 inch by 1 inch on a 2D scale.

5. The method of claim 1, wherein the output data identifies downhole surface wettability at different image scales.

6. The method of claim 1, wherein transforming the multi-physics data comprises vectorizing the multi-physics data into two-dimensional vectors.

7. The method of claim 6, wherein processing the acquired and transformed data comprises generating a new 2-dimensional vectorized matrix that combines both the acquired multi-physics data and the transformed data.

8. The method of claim 7, wherein processing the acquired and transformed data further comprises separating a saturation effect from a wettability effect to derive a wettability index.

9. The method of claim 1, wherein the multi-physics data includes nuclear scattering.

10. The method of claim 1, wherein the multi-physics data is representative of rock and material properties both azimuthally and vertically with a pixel resolution of at least 0.1 inch by 0.1 inch on a 2D scale.

11. The method of claim 1, wherein:
the multi-physics data is representative of rock and material properties both azimuthally and vertically with a pixel resolution of at least 0.1 inch by 0.1 inch on a 2D scale,
the multi-physics data includes nuclear scattering, and
the acquired and transformed data is processed using the data correlation technique and the inversion technique.

12. A system, comprising:
at least one processor configured to acquire multi-physics data and transform, using the at least one processor, the multi-physics data into transformed data, wherein transforming the multi-physics data comprises performing a non-linear data transform using a prior knowledge of wettability;
a data processing engine configured to process the acquired and transformed data using at least one of a data correlation technique and an inversion technique to generate output data, wherein the output data provides an improved wettability characterization as compared to processing the acquired data alone; and
a reservoir tool configured to receive the output data and alter an operation of the reservoir tool in response to the output data received by the reservoir tool.

13. The system of claim 12, wherein the multi-physics data is acquired from downhole logging images, laboratory data, or downhole logging images and laboratory data.

14. The system of claim 12, wherein the multi-physics data includes at least one of electrical, nuclear scattering, nuclear resonance, density and/or acoustical data.

15. The system of claim 12, wherein the multi-physics data is representative of rock and material properties both azimuthally and vertically with a pixel resolution of at least 1 inch by 1 inch on a 2D scale.

16. A non-transitory computer-readable storage medium having stored thereon instructions, which when executed by a processor result in one or more operations, the operations comprising:
acquiring, using at least one processor, multi-physics data;
transforming, using the at least one processor, the multi-physics data into transformed data, wherein transforming the multi-physics data comprises performing a non-linear data transform using a prior knowledge of wettability; and
processing, using a data processing engine, the acquired and transformed data using at least one of a data correlation technique and an inversion technique to generate output data, wherein the output data provides an improved wettability characterization as compared to processing the acquired data alone, wherein the processor is configured to deliver the output data to a reservoir tool, and wherein the reservoir tool is configured to alter an operation of the reservoir tool in response to the output data received from the processor.

17. The non-transitory computer-readable storage medium of claim 16, wherein the multi-physics data is acquired from downhole logging images, laboratory data, or downhole logging images and laboratory data.

18. The non-transitory computer-readable storage medium of claim 16, wherein the multi-physics data includes at least one of electrical, nuclear scattering, nuclear resonance, density and/or acoustical data.

19. The non-transitory computer-readable storage medium of claim 16, wherein the multi-physics data is representative of rock and material properties both azimuthally and vertically with a pixel resolution of at least 1 inch by 1 inch on a 2D scale.

\* \* \* \* \*